US008250888B2

(12) United States Patent
Agazzi

(10) Patent No.: US 8,250,888 B2
(45) Date of Patent: Aug. 28, 2012

(54) DOOR KNOB ASSEMBLY

(76) Inventor: Giovan Agazzi, Sterling Heights, MI (US)

(*) Notice: Subject to any disclaimer, the term of this patent is extended or adjusted under 35 U.S.C. 154(b) by 504 days.

(21) Appl. No.: 12/496,104

(22) Filed: Jul. 1, 2009

(65) Prior Publication Data

US 2010/0117380 A1 May 13, 2010

Related U.S. Application Data

(60) Provisional application No. 61/077,517, filed on Jul. 2, 2008.

(51) Int. Cl.
*B60R 25/02* (2006.01)

(52) U.S. Cl. ............ 70/213; 70/224; 70/312; 292/336.3

(58) Field of Classification Search .................... 70/213, 70/224, 226, 227, 312; 292/336.3
See application file for complete search history.

(56) References Cited

U.S. PATENT DOCUMENTS

| | | | | | |
|---|---|---|---|---|---|
| 251,876 | A | * | 1/1882 | Hathaway | 70/445 |
| 1,217,802 | A | * | 2/1917 | Mattice | 70/213 |
| 1,280,348 | A | * | 10/1918 | Wilson | 70/213 |
| 1,295,810 | A | * | 2/1919 | Stanley | 70/213 |
| 1,430,472 | A | * | 9/1922 | Staggs et al. | 70/213 |
| 1,504,214 | A | * | 8/1924 | Cipriano | 70/213 |
| 1,507,351 | A | * | 9/1924 | Heym | 70/312 |
| 1,613,550 | A | * | 1/1927 | Wildrick | 70/213 |
| 1,750,858 | A | * | 3/1930 | Pollak | 70/211 |
| 3,633,388 | A | * | 1/1972 | Atkinson | 70/80 |
| 3,952,562 | A | * | 4/1976 | Snow | 70/476 |
| 4,308,732 | A | * | 1/1982 | Hau | 70/213 |
| 4,457,147 | A | * | 7/1984 | Cumpston | 70/213 |
| 4,763,497 | A | * | 8/1988 | Nakai | 70/95 |
| 4,881,390 | A | * | 11/1989 | Vale | 70/219 |
| 6,508,089 | B1 | * | 1/2003 | Tsai | 70/213 |
| 6,598,434 | B2 | * | 7/2003 | Yang | 70/213 |
| 7,367,207 | B2 | * | 5/2008 | Yang | 70/284 |
| 7,444,844 | B1 | * | 11/2008 | Lee | 70/21 |
| 7,958,757 | B1 | * | 6/2011 | Lee | 70/21 |
| 2002/0139155 | A1 | * | 10/2002 | Franzen | 70/213 |

* cited by examiner

*Primary Examiner* — Suzanne Barrett

(74) *Attorney, Agent, or Firm* — Gifford, Krass, Sprinkle, Anderson & Citkowski, P.C.

(57) ABSTRACT

A door knob assembly having an access device operable to lock and unlock a door from a door frame. The door knob assembly device includes a spindle and the inner and outer knobs are operatively attached to the spindle. The spindle is operable to move a latching member between a first and second position so as to engage and disengage the door frame. The door knob assembly includes a locking member and a biasing member biasing the locking member so as to engage the rosette and fix the outer knob with respect to the rosette. The door knob assembly further includes an access device operable to receive a code. The access device includes a cam assembly operable to position the cam assembly between a first cam and a second cam position when the proper code is provided so as to fix and release the outer knob relative to the rosette.

11 Claims, 8 Drawing Sheets

DOOR KNOB ASSEMBLY

CROSS-REFERENCE TO RELATED APPLICATION

This application claims priority of U.S. Provisional Patent Application Ser. No. 61/077,517 filed Jul. 2, 2008, which is incorporated herein by reference.

FIELD OF THE INVENTION

The present invention is related to a door knob assembly and in particular to a door knob assembly with an access device operable to actuate a latch assembly so as to release the door from a locking engagement with a door frame.

BACKGROUND OF THE INVENTION

It is currently known to have buildings up for sale locked with a lock box storing the key to the building. The lock box may be attached to the door or a structure adjacent to the building. The lock box includes a cover, latch operable to release the cover, and an interface operable to receive a code. Upon input of the proper code, the cover will open so as to provide access to the key which can then be used to unlock the door and access the building.

It is also known for homes to have a more advanced lock system. An example of an advanced lock system is a lock with an electronic pad wherein the user can enter in an access code and electronically disengage the lock and access the building. However, such electronic systems are expensive and may be prone to being inoperable when there is an electric outage. Furthermore, a conventional key lock may present problems where the owner has lost the key or locked himself out of the building by leaving the key in the locked building.

A combination lock such as a thumb wheel lock may provide an economically feasible way to unlock a door. Current combination locks are operable to lock and unlock a door. However, such combination locks create a positive lock, meaning when used in a door the combination lock will interfere with the operation of the opposing doorknob. Thus a user may be trapped inside of the building when the door is closed. Accordingly it is desirable to have a doorknob with a locking device whereby the user does not have to retain a key but can gain access using a combination or code. It is also desirable to have a door knob that provides access using a combination or code that is relatively inexpensive compared to the door knob with the electronic locking device referenced above. Additionally, it is desirable to having a door knob having a locking device that allows a user to engage the latch mechanism from within the building.

SUMMARY OF THE INVENTION

A door knob assembly having an access device operable to actuate a latch assembly so as to lock and unlock a door is provided. The door knob assembly device includes an outer knob connected with an inner knob operable. The inner and outer knob are operatively attached to a spindle. The spindle is in communication with the latch assembly as so to lock and unlock the door. The spindle extends through the door and interconnects the outer knob to the inner knob. The inner knob and the outer knob are operatively attached to the spindle so as to rotate the spindle and actuate the latch assembly.

The latch assembly includes a latching member. The spindle is operable to move the latching member between a first and second position. In the first position, the latching member is positioned so as to be free of the door frame. In the second position, the latching member is positioned to engage a portion of the door frame so as to fix the door relative to the door frame and prevent the door from opening.

The door knob assembly also includes a lock assembly and a rosette. The lock assembly includes a locking plate and a biasing member. The rosette includes a bore and is fixedly mounted to the door. A portion of the spindle extends through the rosette, and the spindle may freely rotate within the bore of the rosette. The rosette also includes an indexed portion configured to receive the locking member.

The door knob assembly further includes an access device operable to receive a code. The access device includes a cam assembly, and is operable to position the cam assembly between a first cam position and a second cam position when the proper code is provided. The cam assembly is in communication with the locking plate. The locking plate has a locking member at one end and a spindle engaging edge at the other end. The biasing member biases the locking plate against the cam assembly. In the first cam position, the cam assembly is positioned to urge the locking member into a locking engagement with the indexed portion of the rosette so as to prevent the outer knob from being turned. Upon input of the proper code, the cam assembly is moved to the second cam position and the biasing member is operable to urge a portion of the locking plate against the cam assembly so as to displace the locking member with respect to the indexed portion of the rosette and allow the outer knob to rotate, turn the spindle, and move the latching member to the first position.

DETAILED DESCRIPTION OF THE INVENTION

Figure 1:
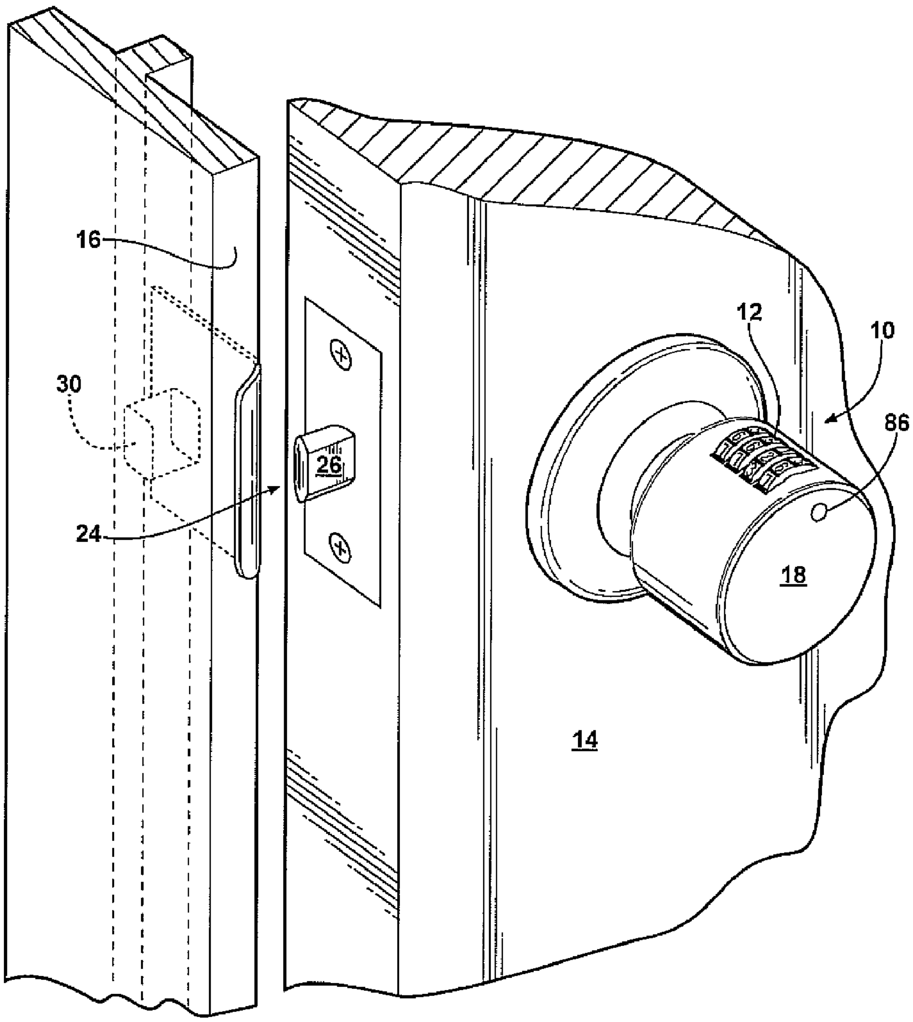
FIG. 1 is a view of the door knob assembly mounted to a door.

With reference now to FIG. 1, a door knob assembly 10 having an access device 12 operable to lock and unlock a door 14 from a door frame 16 is provided. The door knob assembly 10 may be made of a durable material such as steel or a steel composite. The door knob assembly 10 device includes an outer knob 18 interconnected with an inner knob 20. The door knob assembly 10 is mounted to the door 14 such that the outer knob 18 and inner knob 20 are mounted onto opposite sides of the door 14.

The door knob assembly 10 includes a spindle 22. The spindle 22 extends through the door 14 and interconnects the outer knob 18 to the inner knob 20. The inner knob 20 and the outer knob 18 are operatively attached to opposite ends of the spindle 22 so as to rotate the spindle 22. More specifically, the inner knob 20 is fixedly mounted to one end of the spindle 22, and the outer knob 18 is releasably engaged with the opposite end of the spindle 22. Both the outer and inner knob 18, 20 are operable to rotate the spindle so as to actuate the latch assembly 24.

Figures 2, 2A:
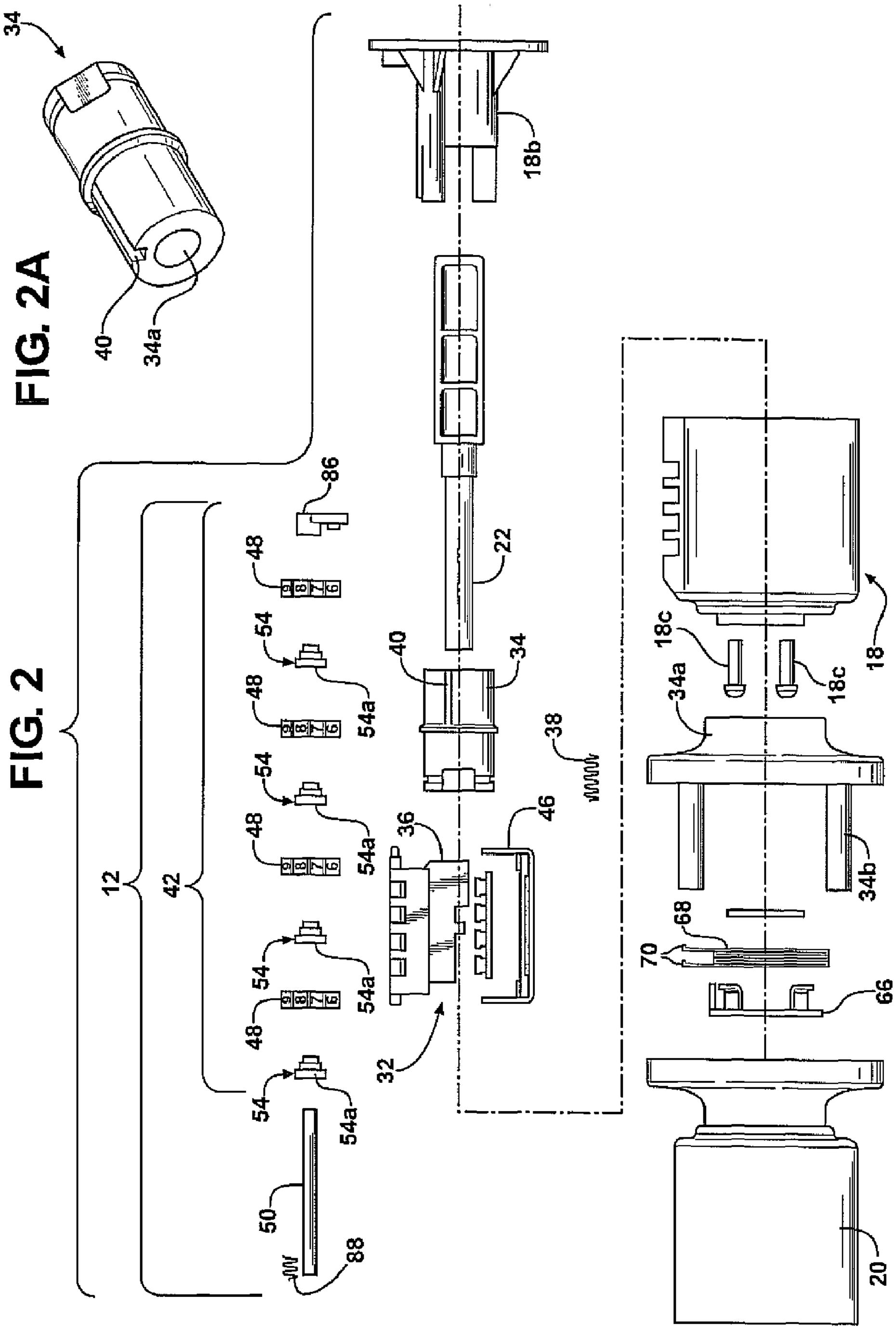
FIG. 2 is an exploded view of the door knob assembly.
FIG. 2*a* is a perspective view of the rosette.

With reference again to FIG. 1 and now to FIG. 2, an exploded view of the door knob assembly 10 is provided. The spindle 22 is also in communication with the latch assembly 24. The latch assembly 24 includes a latching member 26. The spindle 22 is housed within the door 14, and may include a slot 28. The latching member 26 is disposed within a housing of the door 14 and is registered to engage a latch housing 30 disposed along the door frame 16. The spindle 22 is operative to move the latching member 26 between a first and second position in any manner currently known and used in the art. In the first position, the latching member 26 is positioned so as to be free of the door frame 16. In the second position, the latching member 26 is positioned to engage a portion of the door frame 16 so as to prevent the door 14 from opening.

The door knob assembly 10 also includes a lock assembly 32 and a rosette 34. The rosette includes a rosette base **34*a*. The inner door knob 20 includes a support 18*a*. The support 18*a* is configured to receive a pair of fastening devices 18*b* so as to secure the support to the rosette base 34*a*. The lock assembly 32 includes a locking plate 56 and a biasing member 38. The locking plate 56 includes a locking member 36 and a spindle engaging edge 60. The rosette 34 is fixedly mounted to the door 14 and includes an indexed portion 40 configured to receive the locking member 36. The rosette 34 includes a bore 34*a*. The bore extends longitudinally between opposing open ends of the rosette 34. A portion of the spindle 22 extends through bore 34*a* of the rosette 34 so as to interconnect the outer knob 18 with the inner knob 20. The spindle may freely rotate within bore 34*a* of the rosette 34**.

The access device 12 is operable to receive a code. The access device 12 includes a cam assembly 42, and is operable to position the cam assembly 42 between a first cam position and a second cam position when the proper code is provided. The cam assembly 42 is in communication with the lock assembly 32. More specifically, the biasing member 38 biases the lock assembly 32 against the cam assembly 42. In the first cam position, the cam assembly 42 is positioned to urge the locking member 36 into a locking engagement with the indexed portion 40 of the rosette 34 so as to prevent the outer knob 18 from being turned. Upon input of the proper code, the cam assembly 42 is moved to the second cam position and the biasing member 38 is operable to urge a portion of the lock assembly 32 against the cam assembly 42 so as to displace the locking member 36 with respect to the indexed portion 40 of the rosette 34 and allow the outer knob 18 to rotate, turn the spindle, and move the latching member 26 to the first position.

Figure 3:
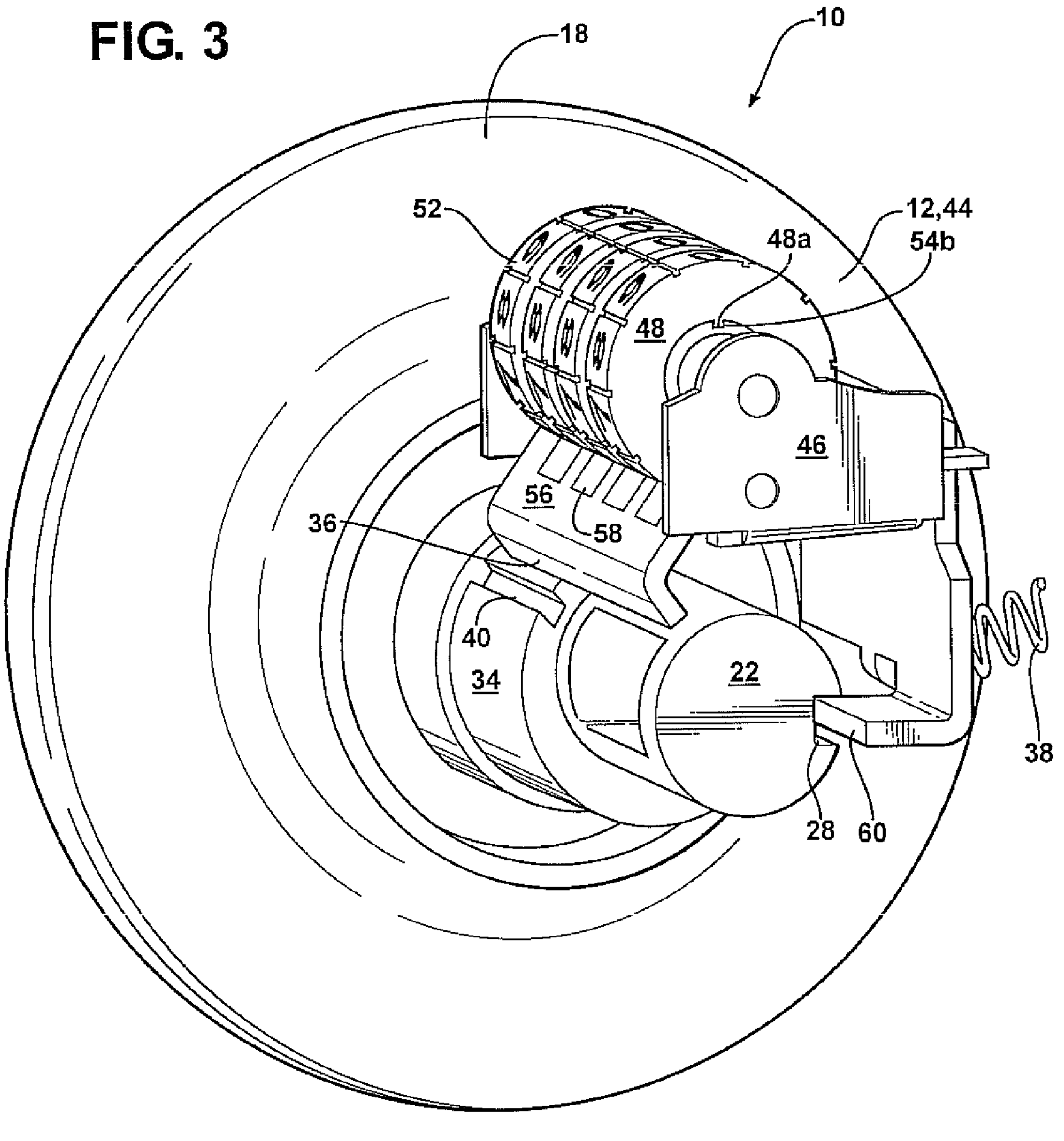
FIG. 3 is a view of the inside of the outer knob showing an illustration of the access device and the lock assembly.

With reference again to FIG. 2, and now to FIG. 3, a view of a preferred embodiment of the door knob assembly 10 is provided. In the preferred embodiment, the access device 12 is a thumb wheel lock assembly 44 mounted to the outer knob 18. The door knob assembly 10 includes a bracket 46 fixedly mounted to the inner surface of the outer knob 18 so as to provide support for the thumb wheel lock assembly 44. A rigid shaft 50 extends between opposite ends of the bracket 46 so as to support the thumb wheel lock assembly 44 along an axis. The thumb wheel lock assembly 44 includes a plurality of thumb wheels 48 rotatably mounted along the rigid shaft 50 so as to be axially aligned along the rigid shaft 50. Each of the thumb wheels 48 are operatively in communication with the cam assembly 42, and each of the thumb wheels 48 are labeled with indicia 52. The cam assembly 42 includes a plurality of cam wheels 54 in operative contact with each of the thumb wheels 48. More specifically, each cam wheel 54 is rotatably mounted to the rigid shaft 50 and aligned along the same axis as the thumb wheels 48. Each thumb wheel 48 is mounted onto each cam wheel 54 so as to move the cam wheel 54 between the first cam position and the second cam position. The thumb wheels 48 have an inner wall defining a bore, and a finger **48*a* projects radially from the inner wall into the bore. The outer surface 54*a* of the cam wheels 54 has an indexed portion 54*b* configured to receive the finger 48*a***.

The locking plate 56 may have a plurality of slots 58 configured to receive the thumb and cam wheels 48, 54. The locking member 36 is supported on one end of the locking plate 56 and the spindle engaging edge 60 is disposed on the other end of the locking plate 56 opposite the locking member 36. The spindle engaging edge 60 is configured to engage the slot 28 of the spindle 22. The locking plate 56 is pivotably supported within the outer knob 18 by the bracket 46. The biasing member 38 is operative to pivotably urge the lock assembly 32 into engagement with the cam assembly 42.

Figure 4:
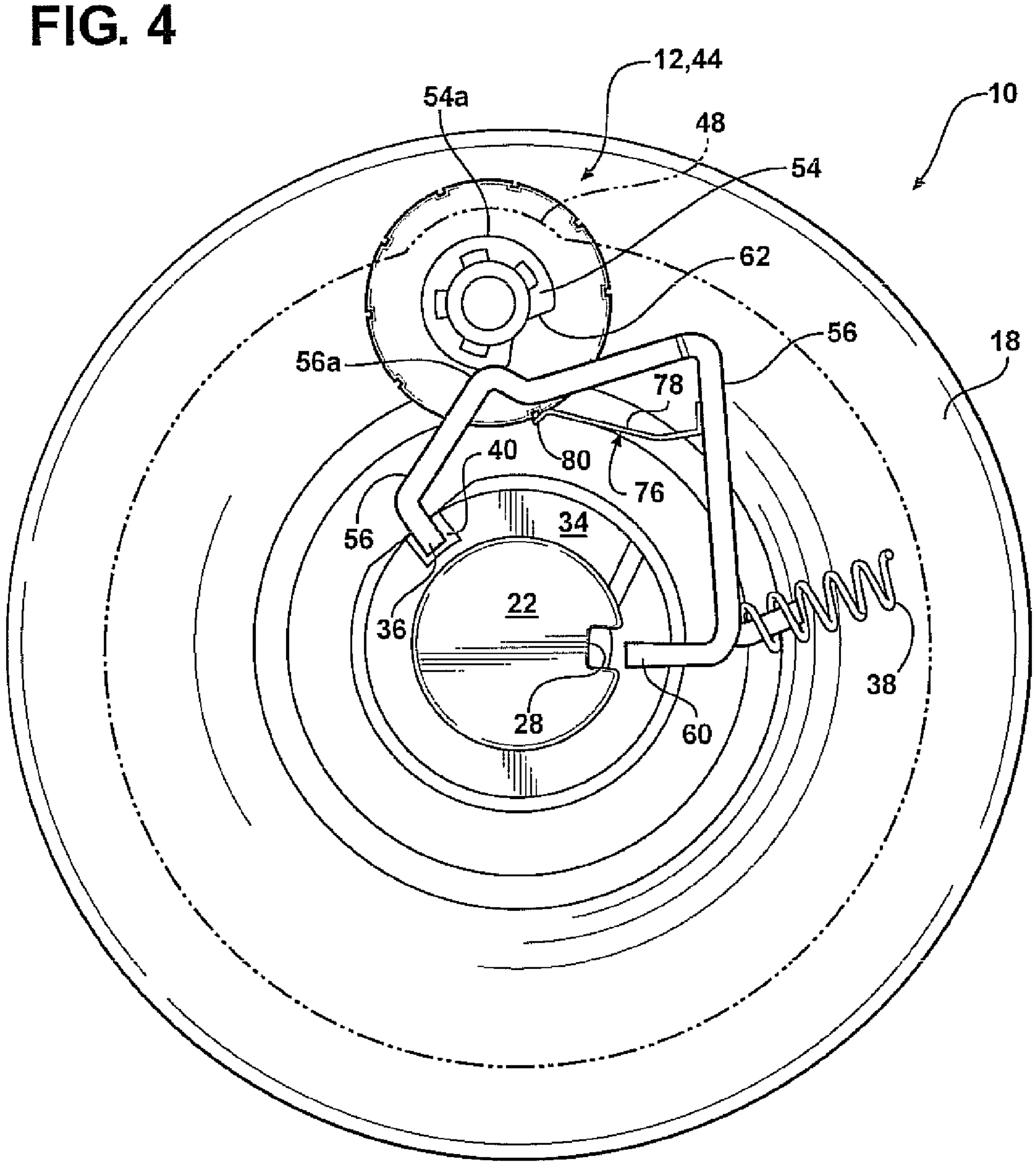
FIG. 4 is a cross-sectional view of the outer knob showing the locking member engaged with the rosette.
Figure 5:
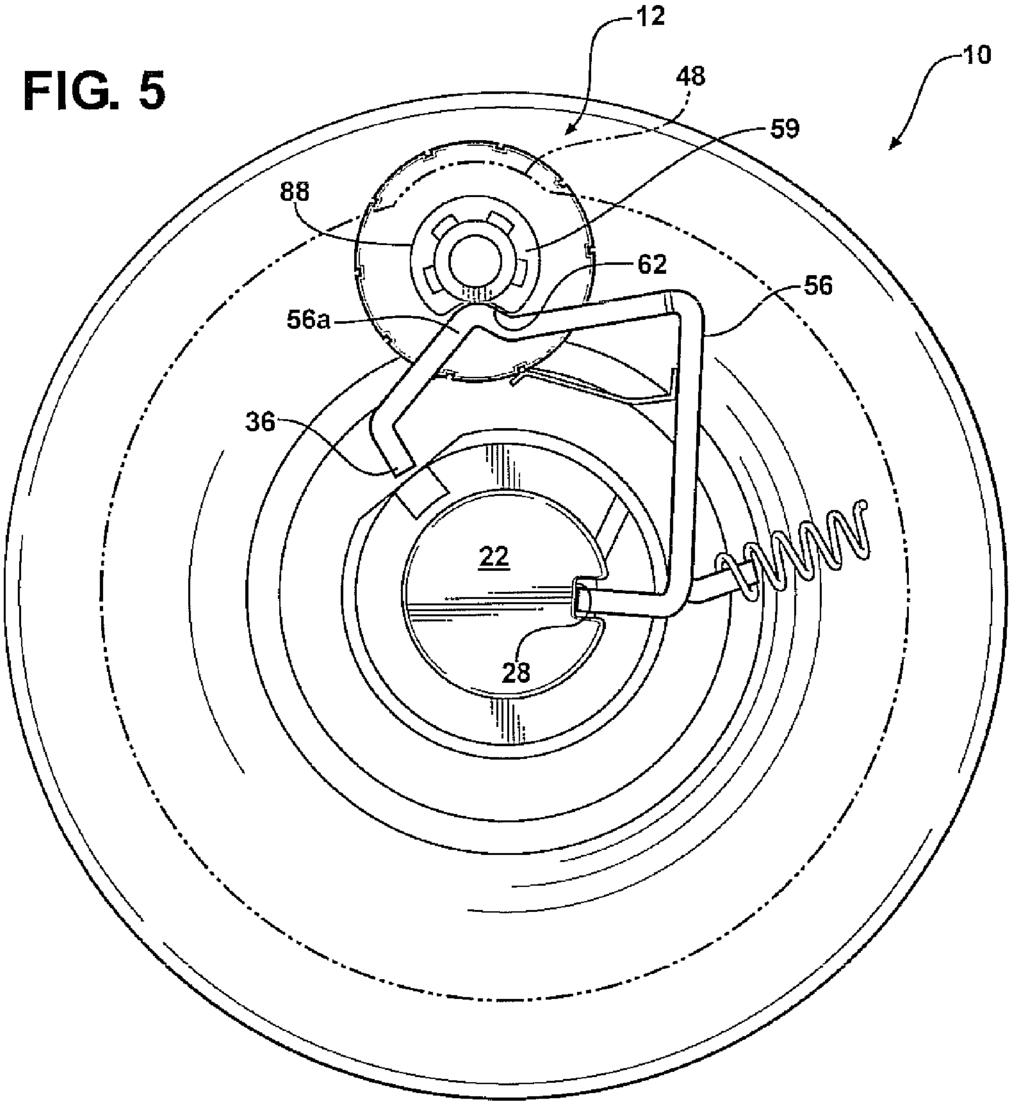
FIG. 5 is a view of FIG. 4 showing the locking member displaced from the rosette and engaged with the spindle.

With reference now to FIGS. 4 and 5, an illustration of the operation of the first preferred embodiment of the door knob assembly 10 is provided. With reference specifically to FIG. 4, the door knob assembly 10 is shown in the locked position. One of the cam wheels 54 of the cam assembly 42 is shown being positioned in the first cam position. The outer surface **54*a* of each cam wheels 54 also includes an operative detent 62. Each of the thumb wheels 48 is operative to rotate a respective cam wheel 54 so as to position the cam wheel 54 between the first cam position and the second cam position. As shown in FIG. 4, in the first cam position, the operative detent 62 is displaced from a cam engaging surface 56*a* of the locking plate 56 so as to urge the locking member 36 into engagement with the rosette 34 and displace the spindle engaging edge 60 from the slot 28 of the spindle 22. As stated above, the bracket 46 is fixedly mounted to the inner surface wall of the outer knob 18, and the locking plate 56 is mounted to the bracket 46. Thus, the locking member 36 fixes the outer knob 18 with respect to the rosette 34, thereby preventing the outer knob 18 from being turned and moving the latching member 26 to the first position. However, the inner knob 20 remains free to rotate the spindle and urge the latching member 26** between the first and second position, as explained in greater detail below.

With reference again to FIG. 5, the door knob assembly 10 is shown in the unlocked position, wherein the outer knob 18 is free to be rotated. The indicia 52 displayed on each of the thumb wheels 48 provide a reference for proper alignment of the operative detent 62 of each cam wheel 54 to unlock the door 14. Each of the thumb wheels 48 may be rotated so as to position the operative detent 62 of each of the cam wheels 54 in communication with the lock assembly 32. Thus, when the indicia 52 are aligned in a predetermined manner, the operative detent 62 of each cam assembly 42 is aligned such that the lock assembly 32 is free of the rosette 34.

The biasing member 38 is then operable to pivot the locking plate 56 into engagement with the operative detent 62 so as to displace the locking member 36 from the indexed portion 40 of the rosette 34 and urge the spindle engaging end into contact with the slot 28 of the spindle 22. Thus, the outer knob 18 is no longer fixed to the rosette 34 and a user is able to turn the outer knob 18 so as to actuate the spindle 22 and place the latching member 26 into the second position. The door 14 is then unlocked and may be opened.

Figure 6:
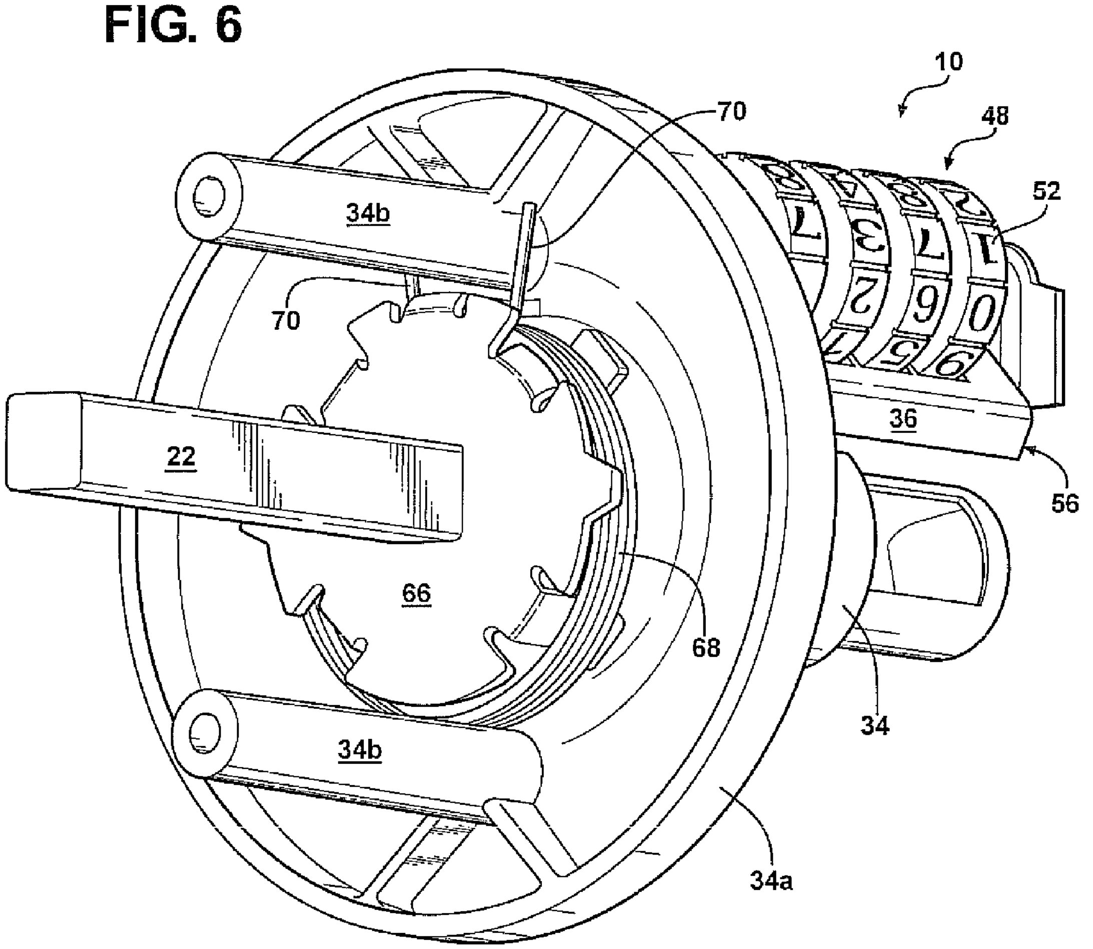
FIG. 6 is a perspective view of the door knob assembly showing the retainer fixedly mounted to the rosette.

With reference again to FIG. 6, an embodiment of the inner knob 20 is illustrated. The rosette 34 also includes a pair of opposing studs **34*b*** spaced apart from each other. The studs 34*b* are mounted in the door 14 and attached to the inner knob 20. The studs 34*b* fix the door knob assembly 10 with respect to the door. The inner knob 20 is fixedly mounted to the spindle 22. As stated above, the spindle 22 is rotatably disposed within the rosette 34. Thus, the inner knob 20 is freely operable to rotate the spindle so as to place the latch assembly 24 in the first or second position.

When the cam assembly 42 is in the first position, the biasing member 38 urges the locking member 36 into engagement with the indexed portion 40 of the rosette 34 so as to fix the outer knob 18 with respect to the rosette 34. The cam assembly 42 actuates the lock assembly 32 so as to urge the spindle engaging edge 60 of the lock plate clear of the slot 28 of the spindle as shown in FIG. 4. Thus, the inner knob 20 is free to turn the spindle 22 and actuate the latching assembly. Since the locking member 36 is engaged with the indexed portion 40 of the rosette 34, the outer knob 18 remains stationary while the inner knob 20 is being turned.

Alternatively, when the cam assembly 42 is in the second position, the biasing member 38 urges spindle engaging edge 60 of the locking assembly into the slot 28 of the spindle 22. The biasing member 38 also urges the locking plate 56 into engagement with the operative detent 62 of the cam wheel 54 so as to displace the locking member 36 from the indexed portion 40 of the rosette 34. Thus, rotation of the inner knob 20 rotates the spindle 22 and the outer knob 18, so as to actuate the latch assembly 24.

With reference again to FIG. 6, the door knob assembly 10 may be configured so as to automatically place the latch assembly 24 in the second position. More specifically, the door knob assembly 10 further includes a retainer 66 and a retainer spring 68. The retainer 66 is mounted to the rosette base 34*a* and a portion of the spindle 22 extends through the retainer 66. The retainer 66 is configured to fittingly engage the spindle 22 so as to rotate with the spindle 22. Preferably the retainer 66 is stamped out of metal.

The retainer spring 68 includes a pair of opposing spring legs 70. The retainer 66 is rotatably attached to the rosette base 34*a*. One of the studs 34*b* is disposed between the pair of opposing spring legs 70. The studs 34*b* extend generally orthogonal from the rosette base 34*a*, and one of the studs 34*b* is also disposed between the opposing spring legs 70. Accordingly, as the inner or outer knob 20, 18 is turned, one of the opposing spring legs 70 is biased against the stud 34*b*. Upon release of either the inner or outer knob 20, 18, one of the spring legs 70 is biased against the stud 34*b* so as to rotate the retainer 66 and spindle 22 and move the latching member 26 to the second position.

Figure 7:
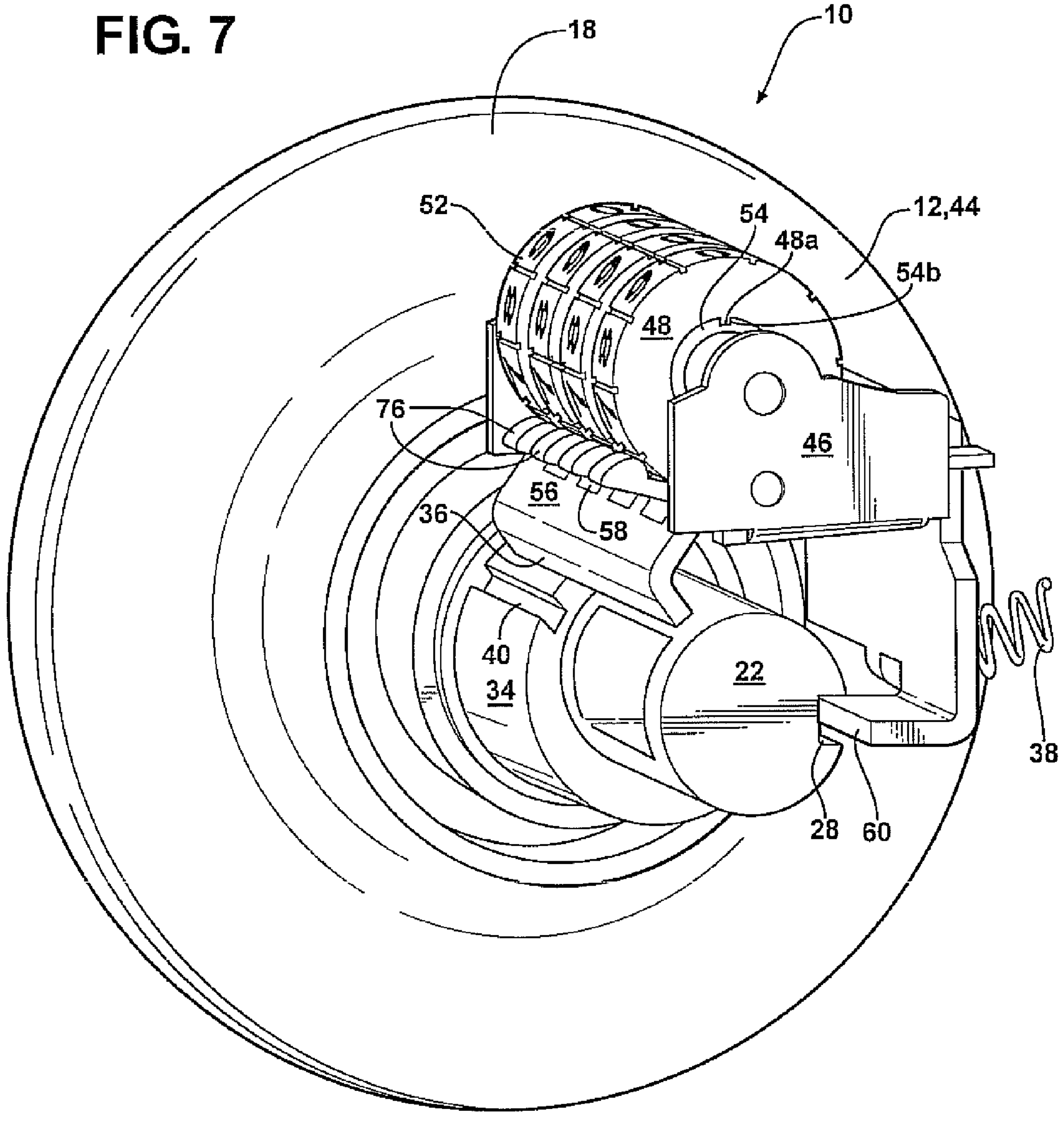
FIG. 7 is a view of a second preferred embodiment of the lock assembly showing the shuffler.

With reference now to FIG. 7, the door knob assembly 10 may further include a shuffler 76. The shuffler 76 includes a shuffler body 78 having a plurality of flanges 80 extending outwardly from the shuffler body 78. The shuffler body 78 may be fixedly mounted to the rosette 34 and housed within the outer knob 18. The flanges 80 extend outwardly from the rosette 34 to a proximate end 82 located adjacent the thumb wheels 48. Upon rotation of the outer knob 18, the thumb wheels 48 are placed in communication with the proximate ends 82 of the flanges 80 so as to rotate the thumb wheels 48 and shuffle the indicia 52.

Figure 8:
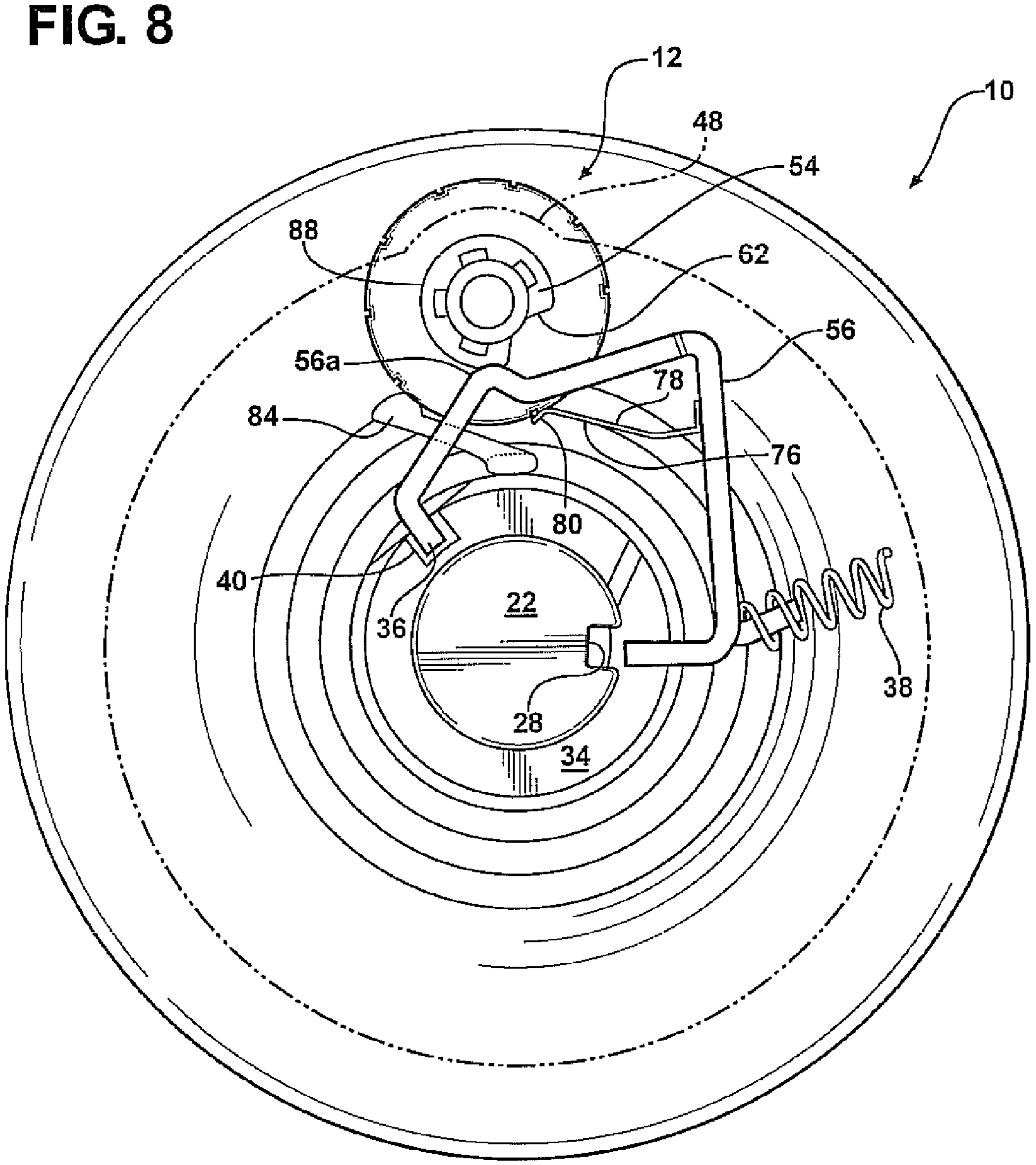
FIG. 8 is a cross-sectional view of FIG. 7 showing the shuffler and damper engaging the access device.

With reference now to FIG. 8, the door knob assembly 10 may further include a damper 84. The damper 84 may be fixedly mounted to the inner surface of the outer knob 18, and is made of a resilient material. The damper 84 is in communication with each of the thumb wheels 48 so as to provide a predetermined amount of resistance against the rotation of the thumb wheels 48. The damper is formed of a resilient material so as to provide resistance to the rotation of the thumb wheels 48.

With reference again to FIG. 2, the door knob assembly may include a reset device 84. The reset device 84 includes a reset button 86 and a reset spring 88. The reset button 86 is mounted to the outer surface of the outer knob 18. A portion of the reset button 86 is in communication with the cam assembly 42. The reset spring 86 is mounted to the rigid shaft 50 opposite the reset button 86. The thumb and cam wheels 48, 54 are disposed between the reset button 86 and the reset spring 88. When the cam wheels 54 are moved to the second position, the reset button 86 is operable to displace the cam wheels 54 free of the thumb wheels 48. More specifically, the cam wheels 54 are slid along the cam engaging surface 54*a* of the lock plate 56. The thumb wheels 48 are free to rotate so that a desired combination of indicia 52 may be displayed. Once the desired combination of indicia 52 is displayed, the user may simply release the reset button 86. The reset spring 88 is then operable to return the cam wheels 54 to a fitting engagement with the thumb wheels 48.

Obviously, many modifications and variations of the present invention are possible in light of the above teachings and may be practiced otherwise than as specifically described while within the scope of the appended claims.

What is claimed is:

1. A door knob assembly having an outer knob connected to an inner knob, wherein the door knob assembly is operable to actuate a latching mechanism so as to lock and unlock the door from a door frame, the door knob assembly comprising:

a spindle interconnecting the outer knob to the inner knob, wherein the inner knob and outer knob are operatively attached to the spindle;

a rosette having an indexed portion, the rosette fixedly mounted to the door and disposed between the inner knob and the outer knob;

an access device having an input operable to receive a code, the access device also having a cam assembly, the access device operable to position the cam assembly between a first cam position and a second cam position when the proper code is received;

a latch assembly in communication with the spindle, the latch assembly including a latching member, wherein the spindle is operable to move the latching member between a first position and a second position, and wherein in the first position the latching member is positioned so as to be free of the door frame and wherein in the second position the latch member is positioned so as to lockingly engage the door frame;

a lock assembly, having a locking plate and a biasing member, the locking plate having a locking member, and wherein the biasing member urges a portion of the locking plate against the cam assembly, wherein in the first cam position, the cam assembly is positioned to urge the locking member into a locking engagement with the indexed portion of the rosette so as to fix the outer knob with respect to the rosette, and wherein in the second cam position, the biasing member is operable urge a portion of the lock assembly against the cam assembly so as to displace the locking member with respect to the indexed portion of the rosette and allow the outer knob to turn the spindle and actuate the latch assembly.

2. A door knob assembly as set forth in claim 1, wherein the locking plate also includes a spindle engaging edge, and wherein the spindle has a slot configured to receive the spindle engaging edge, and wherein the spindle engaging edge is engaged with the slot of the spindle when the cam assembly is in the second cam position so as to place the outer knob in operative communication with the spindle.

3. A door knob assembly as set forth in claim 2, wherein the access device is a thumb wheel assembly having a plurality of thumb wheels, and wherein the cam assembly includes a plurality of cam wheels, and wherein the plurality of thumb wheels and cam wheels are rotatably attached to a rigid shaft, and wherein the plurality of thumb wheels are operatively mounted to the plurality of cam wheels so as to move the plurality of cam wheels between the first cam position and the second cam position.

4. A door knob assembly as set forth in claim 3, wherein each of the plurality of cam wheels include an outer surface having an operative detent, and wherein the locking plate further includes a cam engaging surface, wherein the biasing member urges the cam engaging surface to engage the operative detent so as to displace the locking member from the indexed portion of the rosette when the cam assembly is positioned in the first cam position.

5. A door knob assembly as set forth in claim 1, wherein the rosette includes a rosette base having a pair of spaced apart studs, the studs extend through the door and are configured to attach to the inner knob.

6. A door knob assembly as set forth in claim 5, further including a retainer operatively mounted to the spindle, and a spring fixedly mounted to the retainer, wherein the rotation of the spindle biases the retainer so as to turn the spindle and actuate the latching member into the second position.

7. A door knob assembly as set forth in claim 3, wherein the thumb wheel assembly further includes a reset device, the reset device operable to change the position of each of the plurality of thumb wheels with respect to the cam assembly.

8. A door knob assembly as set forth in claim 7, wherein the reset device includes a button disposed on the outer surface of the outer knob, and a reset spring mounted to the rigid shaft opposite the reset button 86, wherein the thumb wheels and cam wheels are disposed between the reset button and the reset spring, and wherein the reset button is operable to displace the cam wheels free of the thumb wheels when the cam assembly is moved to the second position so as allow the thumb wheels to rotated to a desired combination of indicia, and wherein upon release of the reset button, the reset spring is operable to return the cam wheels to a fitting engagement with the thumb wheels so as to reset the combination.

9. A door knob assembly as set forth in claim 3, wherein the outer surface of each of the plurality of thumb wheels are labeled with indicia.

10. A door knob assembly as set forth in claim 3, further including a damper in communication with the thumb wheel assembly, the damper operative to provide resistance to the rotation of each of the plurality of thumb wheels.

11. A door knob assembly as set forth in claim 9, further including a shuffler, the shuffler having a plurality of flanges and a shuffler body, wherein the shuffler body is fixedly mounted to the inner wall of the outer knob and wherein each of the plurality of flanges extends radially from the shuffler body so as to contact a portion of the plurality of thumb wheels, wherein when the spring urges the outer knob back to the first position each of the plurality of thumb wheels engages the plurality of flanges so as to be shuffled.

* * * * *